Figure 1:
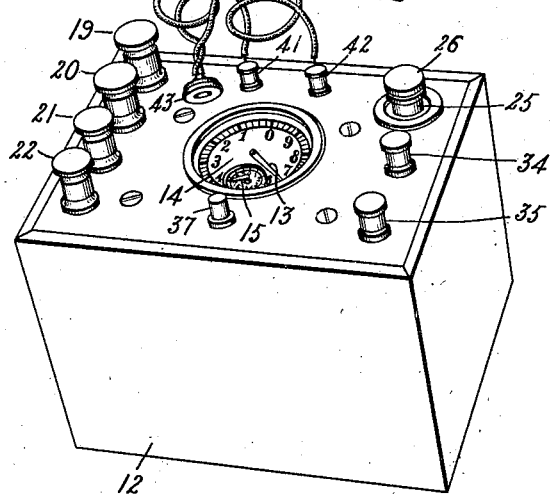

No. 860,987.

PATENTED JULY 23, 1907.

W. J. MOWBRAY.
ELECTRIC METER.
APPLICATION FILED JULY 20, 1905.

2 SHEETS—SHEET 1.

Witnesses:
George H. Tilden.
Arlen Oxford

Inventor:
William J. Mowbray,
by
Att'y.

No. 860,987. PATENTED JULY 23, 1907.
W. J. MOWBRAY.
ELECTRIC METER.
APPLICATION FILED JULY 20, 1905.
SHEETS—SHEET 2.
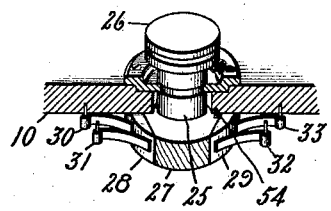
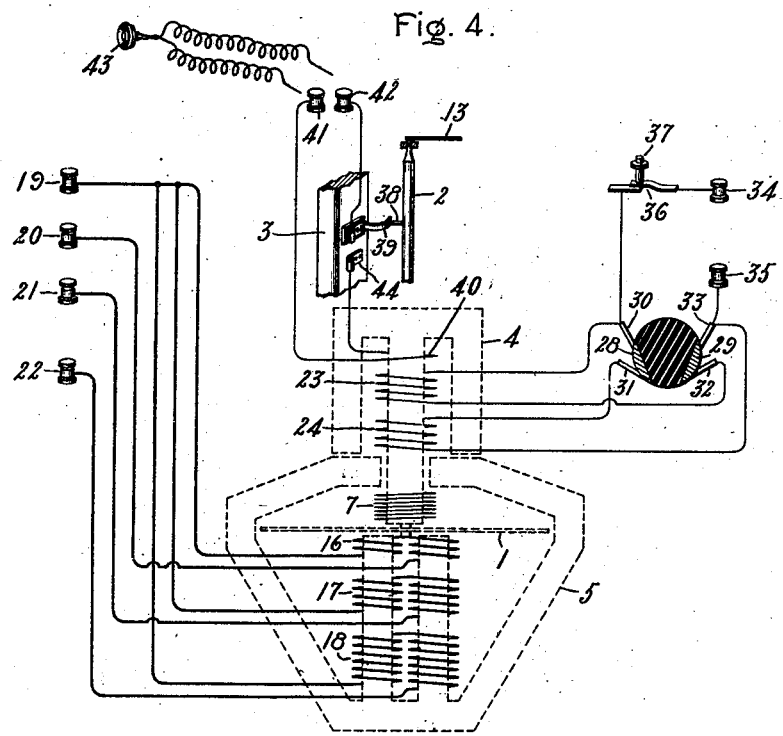
Witnesses:
George H. Tilden.
Helen Oxford
Inventor:
William J. Mowbray,
by Albert H. Davis
Att'y.

UNITED STATES PATENT OFFICE.

WILLIAM J. MOWBRAY, OF BROOKLYN, NEW YORK, ASSIGNOR TO GENERAL ELECTRIC COMPANY, A CORPORATION OF NEW YORK.

ELECTRIC METER.

No. 860,987.　　　　　Specification of Letters Patent.　　　　　Patented July 23, 1907.

Application filed July 20, 1905. Serial No. 270,453.

*To all whom it may concern:*

Be it known that I, WILLIAM J. MOWBRAY, a citizen of the United States, residing at Brooklyn, county of Kings, State of New York, have invented certain new and useful Improvements in Electric Meters, of which the following is a specification.

This invention relates to electric measuring instruments and particularly to portable integrating wattmeters adapted for use in testing wattmeters installed on customers' premises.

Experience has shown that it is quite necessary to periodically test the integrating wattmeters now commonly used to measure the energy consumed by customers, and also that these tests should be made under actual working conditions, that is, while the meter is mounted in position on the premises of the customer. This can be done with electric indicating instruments and a stop watch, but it has been found much more satisfactory and convenient to use a portable integrating wattmeter specially constructed to facilitate making the necessary tests as testing in this way requires much less apparatus, avoids the use of a stop watch, reduces considerably the amount of calculating necessary, and greatly increases the number of meters that can be tested in a given time.

My invention comprises a portable, integrating wattmeter or test meter similar in many respects to the wattmeters now in common use but provided with a number of special features the purposes of which are to facilitate connecting the meter in circuit with a customer's meter in the proper manner and making the necessary tests, to adapt the meter for use in testing meters of various types and capacities, and to eliminate errors inherent in an ordinary meter when used as a testing instrument.
The novel features which I believe to be characteristic of my invention will be definitely indicated in the claims appended hereto.

The details of the construction and the method of using my improved test meter will be better understood by reference to the following description taken in connection with the accompanying drawings.

The features of my invention are illustrated and described as applied to an integrating induction meter but I do not wish to be understood as limited in this respect as some of the features of my invention are equally applicable to integrating meters of the commutating motor type.

Figure 2:
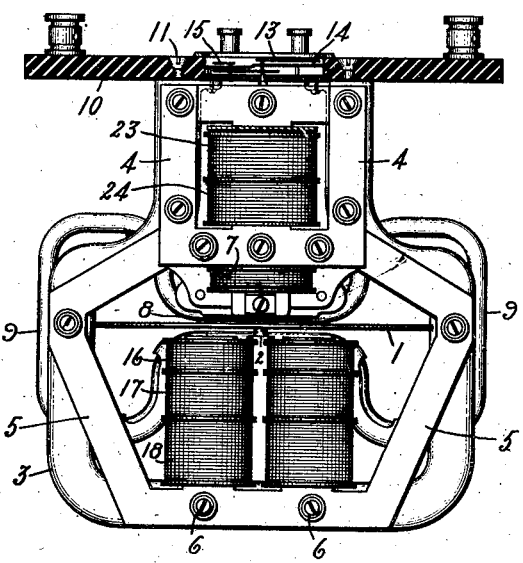

In the drawings, Figure 1 is a perspective view of the meter with the cover removed; Fig. 2 is a back view of the meter removed from the inclosing box with the top plate in central section; Fig. 3 is a detail of the switch in the potential circuit; and Fig. 4 is a diagrammatic view showing the electrical connections.

The instrument consists of an integrating wattmeter of standard construction changed in several respects to facilitate testing. The motive part of the meter comprises a rotatable armature 1 which consists of the usual conducting disk and the stationary magnetic circuit with its energizing coils. Disk 1 is carried by a shaft 2 which is supported in the usual manner on a jewel bearing carried by the frame 3. The stationary magnetic circuit consists of two laminated cores 4 and 5 secured to frame 3 by bolts 6. The arrangement of the magnetic circuit and its coils will be best understood by reference to Fig. 4. In that figure, core 4 is shown with three parallel members connected at the top, with the potential coil mounted on the central member. Core 5 has its extremities extended into close proximity with the three members or poles of core 4, thereby forming with core 4 a nearly closed magnetic circuit for the potential coil, whereby current in the coil is lagged in a manner well understood in the art. Core 5 is provided with two poles facing the central pole of core 4 on which poles the series or current winding of the meter is placed. The disk armature 1 is disposed between the poles on which the series coils are placed and the central pole of core 4. The leakage magnetic flux of the potential coil which does not pass through the nearly closed circuit offered by the extremities of core 5 passes from the central pole of core 4 through the disk to the poles on which are mounted the series coils.

The series coils on the two poles of core 5 are oppositely wound and produce fluxes which, with the flux from the central pole of the core 4, produce a shifting resultant field and consequent rotation of the disk in a manner well understood in the art. A short-circuited coil 7 is mounted on the middle pole of core 4 and assists the flux through the disk to the poles of the series coils and thereby produces the 90° displacement of the potential flux from that of the series coils in a manner well understood. In order to compensate for the starting friction, a closed circuit 8 is suspended directly above the disk 1 and surrounding the central pole of core 4 and is arranged to be horizontally adjustable to vary its compensating effect. Secured to the frame 3 of the meter is a plurality of permanent magnets 9 whose fields are cut by the disk armature 1 to retard the rotation of the moving element of the meter. A more detailed description of these parts of the meter is not considered necessary as they form no part of my invention.

The meter is secured to the under side of a top plate 10 of insulating material by screws 11 extending through plate 10 and into the frame 3. A box 12 incloses the meter, as shown in Fig. 1, the plate 10 resting upon supporting strips secured within the box so that the plate and the meter suspended therefrom are readily removable from the box in order to inspect, adjust or repair any part. A detachable cover may be provided for box 12 to completely inclose the parts when the meter is not in use and a strap may be secured to the box by which the meter may be suspended from the shoulder. The shaft 2 of the moving element is extended above its upper bearing which is located in an opening in the plate 10 and on its upper end carries an indicator 13 which moves over a scale 14 preferably divided off into ten equal parts each of which is subdivided as shown in Fig. 1. A second indicator 15 is geared to the shaft 2 and preferably arranged to rotate at one-tenth of the speed of shaft 2. In practice it is found that this arrangement of the indicator is most convenient as it permits of reading the rotations of the moving element of the test meter while standing directly over it as when the test meter is on the floor and the operator is standing on a ladder in front of a customer's meter.

It is well known that an integrating wattmeter is most accurate when working under full load conditions. However, it is necessary to test a consumer's meter while working on the full load and also on a light load, for instance, one-tenth of its full load; also, it is necessary to test meters of widely varying capacities. In order to permit making such tests, I provide means for obtaining the full load torque of the test meter on widely different loads so that, for each test, the test meter can be run under conditions giving the greatest accuracy. This can be done by providing a series winding of a plurality of turns on the poles of core 5 and connections for including more or less of these turns in circuit on the different loads, the turns being so wound and connected that the portions included in circuit on the different loads will give the proper inductive effect. I prefer, however, to provide a plurality of separate and distinct series coils.
In the drawings I have shown three such coils, 16, 17 and 18 on the poles of core 5, each of which is arranged to produce the full load torque of the meter though on widely different loads. In other words, the number of turns in each of the series coils 16, 17 and 18 is such that each coil give the same number of ampere turns on the load for which it is designed as each of the other coils on the load for which it is designed. Preferably the several series coils are so proportioned that one can be used to test a customer's meter on full load and the next one on light load, the full load torque of the test meter being obtained in each case so that it is running under conditions conducive to greatest accuracy. Mounted on the top plate 10, on the left-hand side, are four binding posts 19, 20, 21 and 22.
One side of each of the series coils 16, 17 and 18 is connected to the binding post 19 and the other sides of the three coils are connected to the posts 20, 21 and 22, respectively so that by connecting the terminals of one of the lines entering a customer's premises to the binding post 19 and one of the other three binding posts, the proper series coil can be selected and connected in series in that line so that the current in the coil will vary with the current consumed in the devices which are connected in circuit.
In many lighting systems both two-wire and three-wire systems of distribution of electric energy are employed and in three-wire systems some of the meters have the potential circuit connected across the two outside mains of the system, while in others it is connected between one of the outside mains and the neutral. In order to adapt my instrument for testing meters of both of these classes, I wind the potential coil of the test meter in two equal coil sections and provide a switch by which the sections may be connected in series or in parallel, the connections being such that in both cases the magnetomotive force of the two sections of the potential coil is cumulative. The two sections of the potential coil are indicated at 23 and 24. Mounted in the top plate 10 is a switch consisting of a stem 25 extending through an opening in the top plate 10 and carrying a knurled head 26 at the top and a cylindrical member 27 at the bottom below plate 10, the latter being formed of insulating material with two metallic conducting segments 28 and 29 secured thereto. Mounted on the under side of plate 10 are four insulated brushes 30, 31, 32 and 33. A stop 54 is arranged to limit the turning movement of the switch so that at one limit of its movement segment 28 connects brushes 30 and 31, and segment 29 connects brushes 32 and 33, and at the other limit of its movement, segment 29 connects brushes 31 and 32. As shown in Fig. 4, the terminals of coil 23 are connected to brushes 30 and 32 and the terminals of coil 24 to brushes 31 and 33. Mounted on the top plate 10 are two potential binding posts 34 and 35, the latter of which is connected to the brush 33. The post 34 is connected to brush 30 through a push button switch 36 biased to open position which may be closed by pressing a button 37 extending up through an opening in the top plate 10.

In making a test, the test meter is connected in circuit with the customer's meter by connecting one of the series coils 16, 17 or 18 in series in one of the lines and the potential coil across the two lines. The series coil is connected in circuit by connecting one terminal of one of the lines to the binding post 19 and the other terminal of that line to the binding post 20, 21 or 22 leading to the coil 16, 17, or 18, respectively, which, on the load at which the test is to be made, will give in the test meter a torque most nearly approaching the full load torque. To connect the potential coil in circuit the binding posts 34 and 35 should be connected each to one of the lines though this circuit is not closed until the button 37 is depressed. If the system is a two-wire system of the usual voltage, or if it is a three-wire system and the potential circuit of the meter is connected across one of the outside lines and the neutral, the switch in the potential circuit is turned by means of the knurled head 26 to bring it to the position shown in Figs. 3 and 4 in which the two coil sections 23 and 24 of the potential coil are connected in parallel, the connections being from binding post 34 to brush 30 and from there through section 23 to brush 32, segment 29 and brush 33 to binding post 35 and also from brush 30 through segment 28 to brush 31, section 24, brush 33, and then to binding post 35. If the system is a three-wire system with the potential circuit of the meter connected across the two outside lines, the switch is turned to the other limit of its range of movement in which position segment 29 bridges brushes 31 and 32 and the potential circuit in this case is from binding post 34 to brush 30, through coil section 23 to brush 32, segment 29 to brush 31, section 24 to brush 33 and then to binding post 35 so that the two sections of the potential coil are connected in series. It will be seen that the two sections of the potential coil are so wound and connected that in either case they exert cumulative inductive effects. Suitable devices consuming electric energy are then cut into circuit until the desired load is obtained, whereupon the moving element of the customer's meter begins to rotate. The operator then presses the button 37 to close the potential circuit of the test meter and thus cause the moving element thereof to rotate and simultaneously therewith he begins to count the rotations of the moving element of the customer's meter. After counting a definite number of revolutions he releases the button 37, whereupon the moving element of the test meter comes to rest. The number of revolutions made by the moving element of the test meter can then be read on the dial of the test meter and the ratio of the revolutions made by moving elements of the customer's meter and of the test meter gives the percentage of accuracy of the customer's meter. The load is then reduced to a fraction of the full load of the customer's meter and the series coil 16, 17 or 18 is connected in circuit which will give as near as possible the full load torque of the test meter at that load. This is done by merely changing the connection to one of the binding posts 20, 21 or 22 to another of those posts. A similar test is then made to get the light load accuracy of the customer's meter.

I have found it advantageous in some cases to provide means whereby the revolutions of the moving element of the test meter can be counted while watching the customer's meter. I accomplish this by providing a telephone receiver and means whereby the moving element of the test meter closes a circuit through the receiver momentarily once in each revolution. Secured to the shaft 2 of the meter is a pin 38, and a light flexible brush 39 is mounted in position to be lightly engaged by the pin to close an electric circuit once in each revolution of shaft 2, the circuit being completed through the telephone receiver by the frame of the meter, the dial and other parts to shaft 2. In some types of meters the current for the telephone receiver may be obtained by closing a shunt around a resistance of small ohmic value, but in a meter of the type illustrated in the drawing I prefer to supply this current by induction. On the central leg of core 4 is a coil 40 which may consist of only one or two turns in which a current of very low voltage is induced in a manner well understood in the art. One terminal of this coil is connected to the frame 3 of the meter as indicated at 44 and the other terminal to a binding post 41 mounted on the top plate 10 of the meter. A second binding post 42 mounted on plate 10 is connected to the brush 39 which is insulated from frame 3. The telephone receiver 43 is provided with long flexible leads by which connection is made to the binding posts 41 and 42. It will be seen that in each revolution of the moving element of the test meter the pin 38 engages brush 39 momentarily thus closing the circuit of coil 40, the circuit being from coil 40 to binding post 41, through the receiver 43 to binding post 42, to the insulated brush 39, pin 38, shaft 2, then through the bearings and dial to the frame 3 to which the other side of coil 40 is connected.

When using the receiver, the test meter is connected in circuit with the customer's meter in the manner above described. The operator holds the receiver 43 to his ear and by counting the clicks occasioned by the momentary closure of the circuit of the receiver he can count the number of revolutions of the moving element of the test meter while watching the moving element of the customer's meter. If the disk of the customer's meter is marked off to a scale or if a printed scale is secured thereon, the operator ascertains the number of revolutions or fractions of a revolution made by the moving element of the customer's meter while the test meter is making a definite number of revolutions, preferably ten. The accuracy of the customer's meter is then found as before. As the ratio in this case is based on ten instead of on the number of revolutions made by the moving element of the test meter while that of the customer's meter is making ten revolutions, the accuracy of the customer's meter can be determined immediately with sufficient exactness without restoring to an exact calculation.

I do not wish to be understood as limited to the exact construction which I have illustrated and described herein as many modifications can be made therein without departing from the spirit of my invention; all such modifications I consider within the scope of my invention and I aim to cover them by the terms of the claims appended hereto.

What I claim as new and desire to secure by Letters Patent of the United States, is:—

1. An induction meter comprising a magnetic core, a potential coil thereon, a second core, a series winding thereon, a plurality of binding posts, connections from said binding posts to different points on said series winding, and an armature mounted for rotation between said cores.

2. An induction meter comprising a magnetic core, a potential coil thereon, a second core, a plurality of series coils thereon, an armature mounted for rotation between said cores, and binding posts to which the several series coils are connected.

3. An induction meter comprising a magnetic core, a potential coil thereon, a second core, a plurality of series coils thereon, an armature mounted for rotation between said cores, a binding post to which one side of each of said series coils is connected, and a plurality of binding posts to each of which the other side of one of said coils is connected.

4. An integrating electric meter comprising a moving element, a current coil in inductive relation thereto, a shunt circuit, two binding posts, and a switch arranged to connect the shunt circuit between said binding posts in one position and in the other position to divide said shunt circuit into two parts of substantially equal resistance and connect said parts in parallel between said binding posts.

5. In an integrating induction meter, a potential coil consisting of a plurality of coil sections and means for connecting said sections in series or in parallel with cumulative inductive effects.

6. An integrating induction meter comprising a magnetic core, a potential coil consisting of a plurality of coil sections thereon, means for connecting said coil sections in series or in parallel with cumulative inductive effects, a second core, a current coil thereon, and a disk armature mounted for rotation between said cores.

7. In an integrating induction meter, a potential coil consisting of a plurality of coil sections, two binding posts, and a switch arranged to connect said coil sections between said binding posts in series or in parallel with cumulative inductive effects.

8. An integrating induction meter comprising a support, a frame secured thereto, a magnetic core carried by the frame, a potential coil consisting of a plurality of coil sections on said core, a switch mounted on said support and arranged to connect said coil sections in series or in parallel with cumulative inductive effects, a second core, a current coil thereon, and a disk armature mounted for rotation between said cores.

9. An integrating electric meter comprising a moving element, a current coil in inductive relation thereto, a shunt circuit divided into two parts of substantially equal resistance, a switch arranged to connect said parts in series or in parallel, and a switch normally biased to an open circuit position included in said shunt circuit.

10. An integrating induction meter comprising a moving element, a plurality of series coils mounted in inductive relation thereto, means for connecting any one of said series coils in circuit, a shunt coil also mounted in inductive relation to the moving element and comprising a plurality of coil sections, and means for connecting said coil sections in series or in parallel with cumulative inductive effects.

In witness whereof I have hereunto set my hand this 14th day of July, 1905.

WILLIAM J. MOWBRAY.

Witnesses:
Jos. C. Hecker, Jr.,
Joseph Jackson.